US009323993B2

(12) United States Patent
Wang et al.

(10) Patent No.: US 9,323,993 B2
(45) Date of Patent: Apr. 26, 2016

(54) ON-STREET PARKING MANAGEMENT METHODS AND SYSTEMS FOR IDENTIFYING A VEHICLE VIA A CAMERA AND MOBILE COMMUNICATIONS DEVICES

(71) Applicant: Xerox Corporation, Norwalk, CT (US)

(72) Inventors: Yao Rong Wang, Webster, NY (US); David Cummins, Washington, DC (US); Matthew Darst, Chicago, IL (US); Michael Furst, Penfield, NY (US); Panya Chanawangsa, Williamsville, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 265 days.

(21) Appl. No.: 14/018,628

(22) Filed: Sep. 5, 2013

(65) Prior Publication Data
US 2015/0063646 A1 Mar. 5, 2015

(51) Int. Cl.
*G06K 9/00* (2006.01)
(52) U.S. Cl.
CPC .................... *G06K 9/00812* (2013.01)
(58) Field of Classification Search
USPC .................................................. 382/103–105
See application file for complete search history.

(56) References Cited

U.S. PATENT DOCUMENTS

| | | | |
|---|---|---|---|
| 5,504,314 A * | 4/1996 | Farmont | E04H 6/42 |
| | | | 194/902 |
| 6,085,124 A * | 7/2000 | Choi | E04H 6/422 |
| | | | 414/234 |
| 6,285,297 B1 | 9/2001 | Ball | |
| 6,374,182 B2 * | 4/2002 | Bechtolsheim | 340/988 |
| 6,690,294 B1 * | 2/2004 | Zierden | G08G 1/052 |
| | | | 340/933 |
| 6,885,312 B1 | 4/2005 | Kirkpatrick | |
| 6,970,101 B1 | 11/2005 | Squire et al. | |
| 7,049,979 B2 | 5/2006 | Dunning | |

(Continued)

FOREIGN PATENT DOCUMENTS

EP 2 444 924 A1 4/2012

OTHER PUBLICATIONS

Cooper, R., "DC Parking Meters—Pay by Phone Parking in Washington DC," About.com Guide, printed Aug. 17, 2013 2 pages, Parkmobile USA.

(Continued)

*Primary Examiner* — Alex Liew
(74) *Attorney, Agent, or Firm* — Kermit D. Lopez; Luis M. Ortiz; Ortiz & Lopez, PLLC

(57) ABSTRACT

Methods, systems and processor-readable media for identifying a vehicle for street parking management. An initial identification of one or more vehicles detected parked along a street can be generated based on one or more of a group of factors. The initial identification can be communicated to a user of the vehicle by transmitting an image indicative of the vehicle parked along the street (e.g., via a mobile communications device). An operation can then be implemented for requesting a confirmation or a non-confirmation as to whether the vehicle detected and displayed on the image is associated with the user. Upon confirmation, an operation can be implemented for identifying the at least one vehicle as the initial identification. Upon non-confirmation, an operation can be implemented to query to identify the vehicle associated with the user from among a group of vehicles displayed via the image.

20 Claims, 13 Drawing Sheets

(56) References Cited

U.S. PATENT DOCUMENTS

| | | | |
|---|---|---|---|
| 7,104,447 B1* | 9/2006 | Lopez | G07B 15/02 235/381 |
| 7,111,997 B2 | 9/2006 | Wesselink et al. | |
| 7,116,246 B2 | 10/2006 | Winter et al. | |
| 7,492,283 B1 | 2/2009 | Racunas, Jr. | |
| 7,640,107 B2* | 12/2009 | Shimizu | B60K 35/00 340/932.2 |
| 7,660,435 B2* | 2/2010 | Yamaguchi | G01M 17/007 345/629 |
| 7,706,944 B2 | 4/2010 | Tanaka et al. | |
| 7,804,980 B2* | 9/2010 | Sasaki | G06K 9/00791 340/435 |
| 8,063,797 B1* | 11/2011 | Sonnabend | G06K 9/00791 340/932.2 |
| 8,447,463 B1 | 5/2013 | Chowdhary et al. | |
| 8,712,105 B2* | 4/2014 | Rowsell | G06K 9/00785 382/104 |
| 2001/0039509 A1* | 11/2001 | Dar | G06Q 20/127 705/13 |
| 2002/0008639 A1* | 1/2002 | Dee | G07B 15/02 340/932.2 |
| 2002/0047901 A1* | 4/2002 | Nobori | B60R 1/00 348/149 |
| 2002/0141618 A1* | 10/2002 | Ciolli | G08G 1/20 382/104 |
| 2002/0191843 A1* | 12/2002 | McClanahan | G01J 3/46 382/162 |
| 2002/0196340 A1* | 12/2002 | Kato | B60R 1/00 348/148 |
| 2004/0039632 A1* | 2/2004 | Han | G06Q 20/32 705/13 |
| 2004/0153243 A1* | 8/2004 | Shimazaki | B62D 15/0275 701/300 |
| 2004/0218785 A1* | 11/2004 | Kim | G08G 1/0175 382/105 |
| 2005/0073436 A1* | 4/2005 | Negreiro | G08G 1/017 340/937 |
| 2006/0227997 A1* | 10/2006 | Au | G06K 9/00771 382/103 |
| 2006/0278705 A1* | 12/2006 | Hedley | G07B 15/063 235/384 |
| 2008/0079554 A1* | 4/2008 | Boice | B60R 25/305 340/436 |
| 2008/0101656 A1* | 5/2008 | Barnes | G06T 7/0042 382/104 |
| 2010/0092037 A1* | 4/2010 | Peleg | G06F 17/3079 382/103 |
| 2010/0280956 A1* | 11/2010 | Chutorash | G06Q 20/20 705/64 |
| 2011/0140927 A1* | 6/2011 | Lee | G08G 1/207 340/993 |
| 2012/0092190 A1* | 4/2012 | Stefik | G06Q 10/02 340/932.2 |
| 2012/0095790 A1 | 4/2012 | Stefik et al. | |
| 2012/0106801 A1* | 5/2012 | Jackson | G08G 1/205 382/105 |
| 2012/0280836 A1* | 11/2012 | Roesner | G08G 1/147 340/932.2 |
| 2013/0117077 A1 | 5/2013 | Li et al. | |
| 2013/0138481 A1 | 5/2013 | Handley | |
| 2013/0258107 A1* | 10/2013 | Delibaltov | G06K 9/00785 348/148 |
| 2014/0355822 A1* | 12/2014 | Choi | G06K 9/00812 382/103 |

OTHER PUBLICATIONS

NYC Parking Tickets | NYC Parking Violations, http://parkitnyc.com/parking-nyc/nyc-parking-tickets, printed Aug. 17, 2013, 4 pages.

Parkmobile Mobile Payment Parking Solution, http://us.parkmobile.com/members, printed Aug. 17, 2013, 2 pages.

PaybySky, http://paybysky.com, printed Aug. 17, 2013, 2 pages.

\* cited by examiner

ON-STREET PARKING MANAGEMENT METHODS AND SYSTEMS FOR IDENTIFYING A VEHICLE VIA A CAMERA AND MOBILE COMMUNICATIONS DEVICES

FIELD OF THE INVENTION

Embodiments are generally related to the field of parking management. Embodiments are also related to mobile communication devices and applications thereof. Embodiments are additionally related to image assisted parking space management.

BACKGROUND

A balance between supply and demand must be determined to meet the parking requirements of motorists. The ability to efficiently allocate and manage on-street parking remains elusive, even when parking requirements are significant, recurring, and known ahead of time. For instance, urban parking spaces characteristically undergo periods of widely skewed demand and utilization, with low demand and light use in some periods, often during the night, and heavy demand and use at other times. Real-time parking occupancy detection systems are an emerging technology in parking management.

Some prior art parking occupancy detection approaches utilize a puck-style sensor configuration that outputs a binary signal when detecting a vehicle in, for example, a parking stall or a particular parking spot. FIG. 1, for example, illustrates respective parking occupancy detection system 100 for parking occupancy detection in an on-street parking. In the example depicted in FIG. 1, system 100 includes one or more puck-style in-ground sensors 102, 104, 106. Also depicted in FIG. 1 are example parking spaces 110, 108, 112, 114. A vehicle 116 is shown parked in parking space 108 in FIG. 1. The vehicle 116 can be detected by a sensor similar to 102, 104, and 106 located in parking space 108 underneath the vehicle 116. In the example shown in FIG. 1, the sensors 102, 104, and 106 can provide real-time data in order to aid drivers searching for the parking spots and to reduce traffic congestion in cities due to drivers circling about parking lots in a wasteful and time consuming effort to find parking spots.

On-street/curbside parking space reservation systems have also been proposed based on inputs from in-ground sensors. Such prior art parking space management and reservation systems are based on the use of binary sensor input data for determining parking spot availability only. Hence, customers are unable to preview the parking space before making a reservation or arriving at the desired parking spot.

Video-based parking occupancy detection systems, an example of which is shown in FIG. 2, are a recently developed technology. The video-based parking occupancy detection system shown in FIG. 2, for example, generally includes an image-capturing unit 152 (e.g., a video camera) mounted on, for example, a pole 151. The image-capturing unit 152 monitors within its field of view one or more vehicles 154, 156, 158 respectively parked in parking spaces 160, 162, 164.

FIG. 3 illustrates an ultrasonic parking sensor system that includes one or more ultra sonic sensors 176, 178, 180 deployed, for example, in a ceiling of a parking garage with respect to parking spaces 171, 173, 175 in which respective vehicles 170, 172, and 174 are parked.

The ability to identify a vehicle in an on-street parking situation is technologically difficult. In-ground sensor technology is inheritably not capable of identifying vehicles with precision. It is difficult even for video-based parking occupancy detection technology because once a vehicle is parked there is not always a good angle for a camera to take an image of the vehicle's license plate. One previous suggestion involved using one camera to capture the license plate of a vehicle before (or after) parking while another to track the vehicle to (or from) its parking position. However, robust vehicle tracking at street traffic condition is still an open and difficult research topic.

Vehicle identification is important for on-street parking management applications such as an automatic parking payment system where a user is allowed to set up an account for parking. Correct association of a parking vehicle with its account is crucial for charging the correct amount of a parking fee to a user. Correct association between parking vehicles and parking accounts is also important for municipal authorities as on-street parking violation enforcement is an important problem and is also a great source of revenue for municipalities, cities, local governments, etc.

Another proposal involves identifying the parking vehicle and associate it with an pre-arranged payment method. An in-car device that incorporates GPS and additional sensors can be installed inside the vehicle. This in-car device can act as an identifier among other vehicles in the area. While this solution solves the problem of identifying each parking vehicle, it has several drawbacks. First, a user's privacy may be compromised as the vehicle is forced to include the device all the time, and someone else other than the user knows where the user is all the time. Obviously, many users may not like this method. Secondly, the solution requires participating garages or street blocks to give a GPS location boundary map to know when a participating vehicle enters the boundary.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved parking management methods and systems.

It is another aspect of the disclosed embodiments to provide for an improved system that utilizes video-based parking occupancy detection technology and mobile communication devices and wireless networks.

The aforementioned aspects and other objectives and advantages can now be achieved as described herein. Methods, systems and processor-readable media are disclosed for identifying a vehicle for street parking management. An initial identification of one or more vehicles detected parked along a street can be generated based on one or more of a group of factors. The initial identification can be communicated to a user of the vehicle by transmitting an image indicative of the vehicle parked along the street (e.g., via a mobile communications device). An operation can then be implemented for requesting a confirmation or a non-confirmation as to whether the vehicle detected and displayed on the image is associated with the user. Upon confirmation, an operation can be implemented for identifying the at least one vehicle as the initial identification. Upon non-confirmation, an operation can be implemented to query to identify the vehicle associated with the user from among a group of vehicles displayed via the image.

The disclosed embodiments utilize particular video-based parking occupancy detection technology ("VPODT") as well as mobile technology to accurately identify a parked vehicle. The disclosed approach generally includes the following steps: (1) detecting vehicles parked on a street side or within a street block using our VPODT; (2) the customer or user (either pre-registered or registering for a parking account) sends a "start parking" message to initiate the parking session using his/her mobile device (or a vehicle on-board wireless communication device); (3) the VPODT matches at least one feature among a plurality of features for the detected vehicle to the vehicle profile from registration and the "start parking" message using GPS location, time stamp, vehicle color, and vehicle size; and (4) a confirming image of the matched vehicle can be sent to the user's mobile device for review. If the association is accurate, the user's account will be debited; if not, the user selects the appropriate association. After correct association, the camera can monitor the duration of the parking for the user. The exact parking fee based on the duration can be charged to the user's account.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
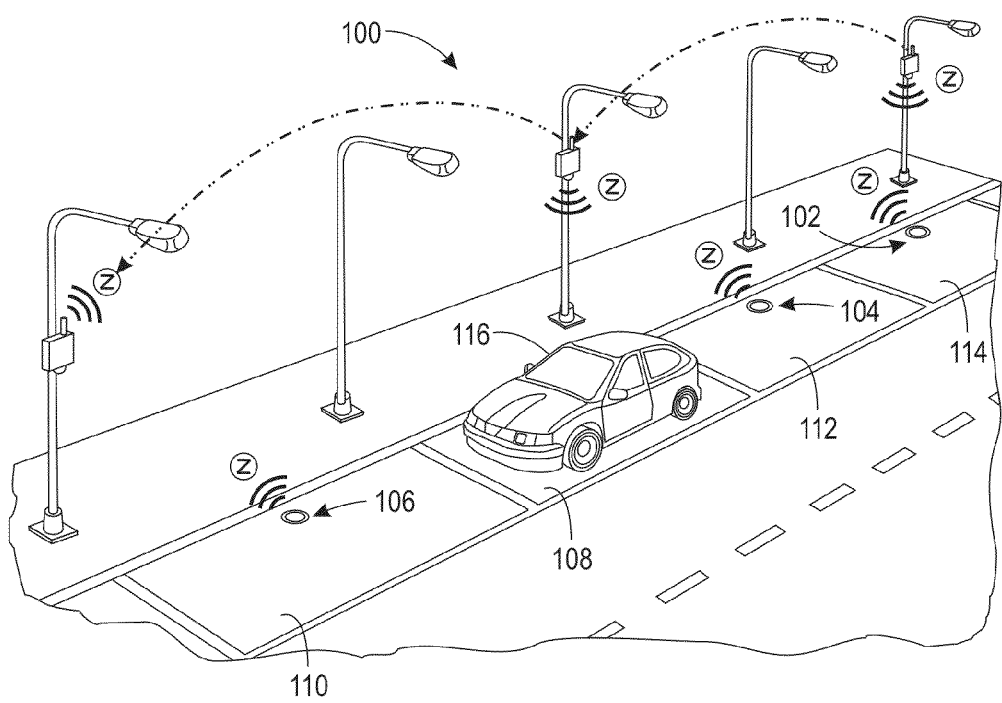
FIG. 1 illustrates a prior art parking occupancy detection system based on a puck-style sensor.
Figure 2:
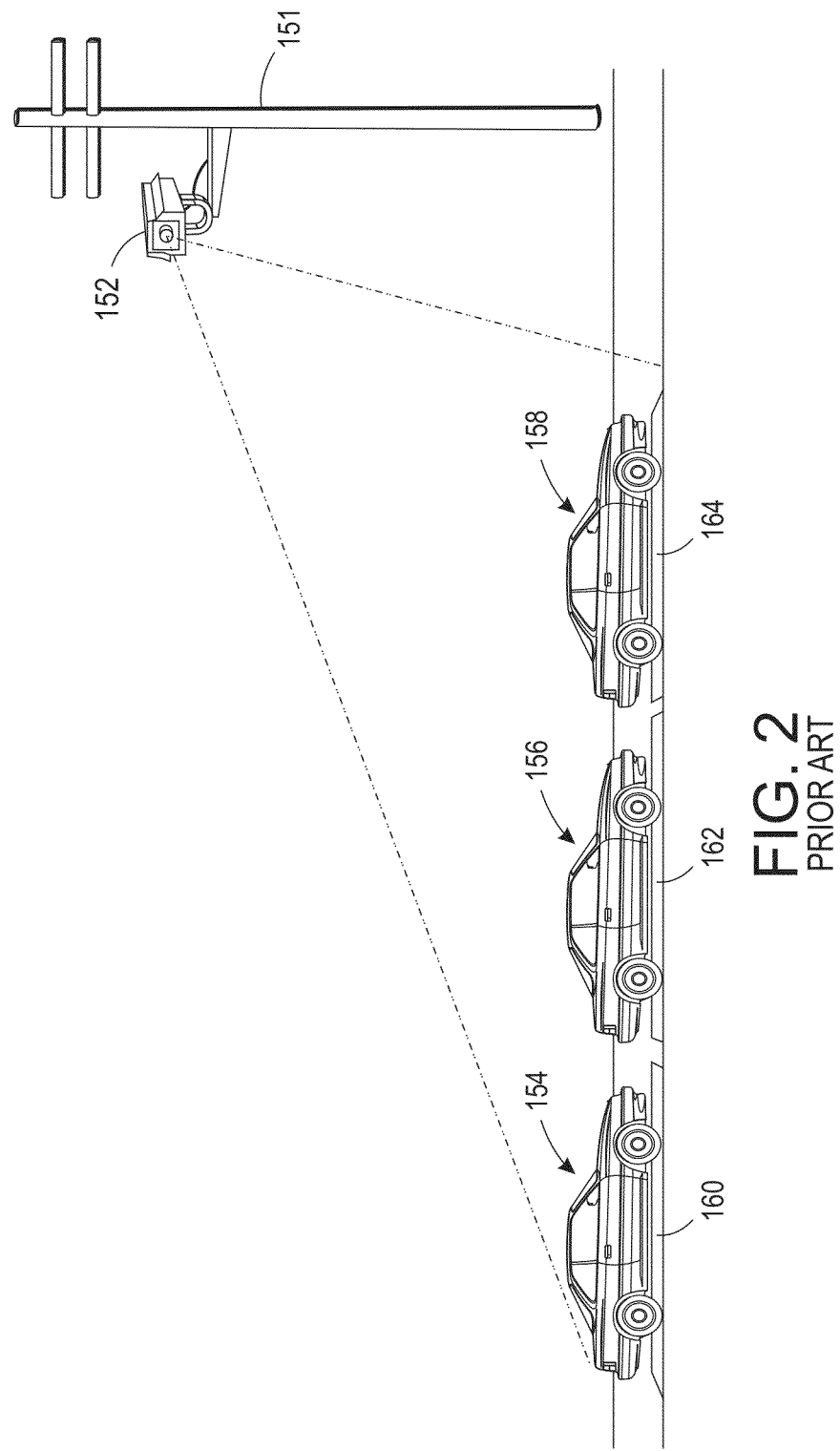
FIG. 2 illustrates a prior art video-based parking occupancy detection system with an image capturing unit.
Figure 3:
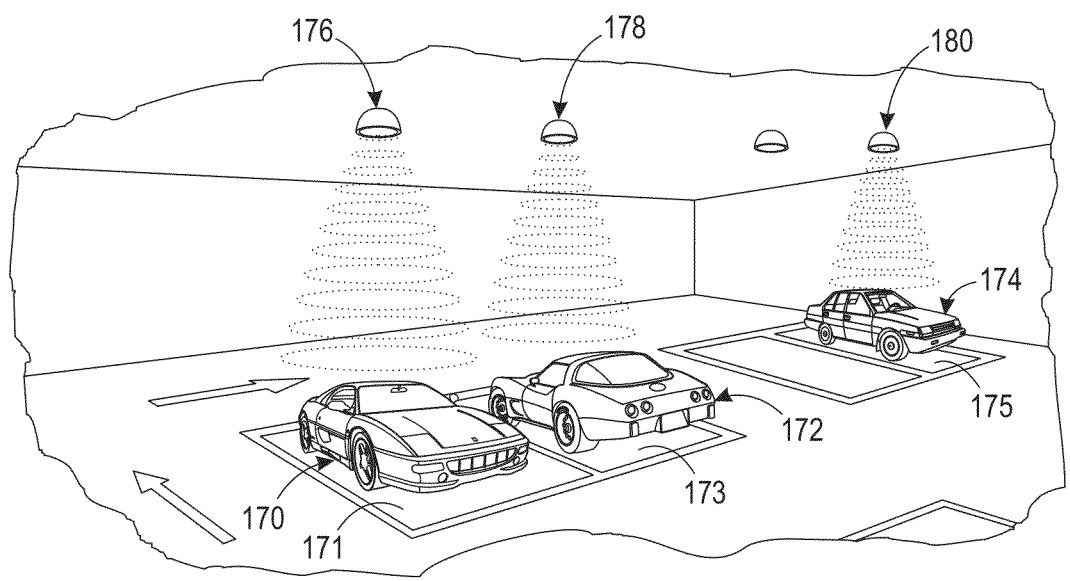
FIG. 3 illustrates a prior art ultrasonic parking sensor system.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The disclosed embodiments employ video-based parking occupancy detection technology as well as the mobile/wireless communication technology to accurately identify a parking vehicle. The disclosed embodiments generally include a number of steps or logical operations. For example, an operation can be provided detecting vehicles parked on a street side or within a street block using the disclosed video based parking occupancy detection technology. The user/driver, who is already registered (or registering) for a parking account, can send a "start parking" message to initiate the parking session using his/her mobile device (or a vehicle on-board wireless communication device). Additionally, a step or logical operation can be provided to closely match features for one of the detected vehicles to the vehicle profile from registration and the "start parking" message using GPS location, time stamp, vehicle color, and vehicle size. The image of the closely matched vehicle can then be sent to the user's mobile device to ask if this is his/her vehicle. If yes, this vehicle is associated to the user's account. If no, an image of a larger section of the street is displayed and the user is requested to identify his/her vehicle in the image. User interlace tools such as sliding, re-sizing, pointing, etc., can be applied. Once the vehicle is identified, it is associated with the user's account. After correct association, the camera can monitor the parking duration for the user and an exact parking fee can be charged to the user's account.

As will be appreciated by one skilled in the art, the disclosed embodiments can be embodied as a method, data processing system, or computer program product. Accordingly, the present invention may take the form of an entire hardware embodiment, an entire software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., VViFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 4:
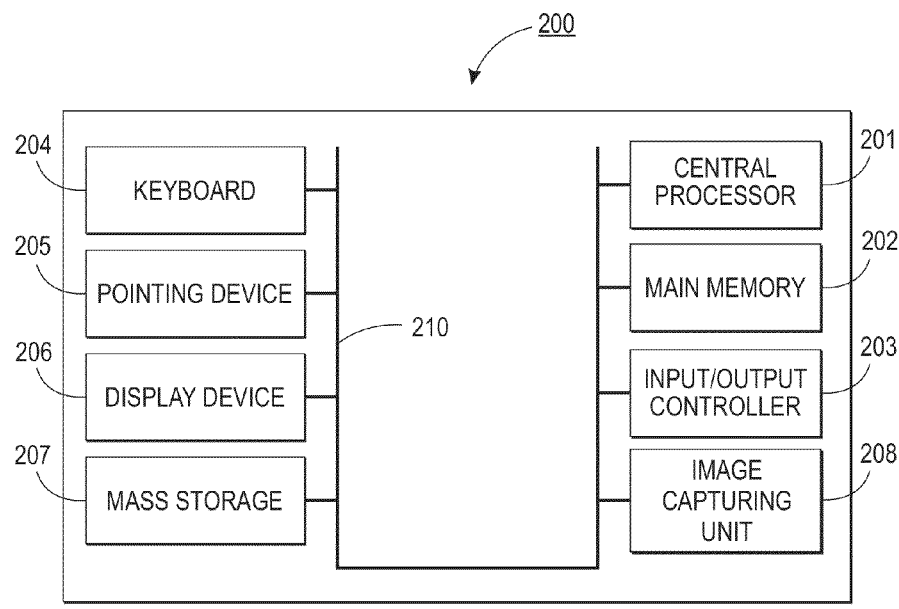
FIG. 4 illustrates a schematic view of a computer system, in accordance with the disclosed embodiments.
Figure 5:
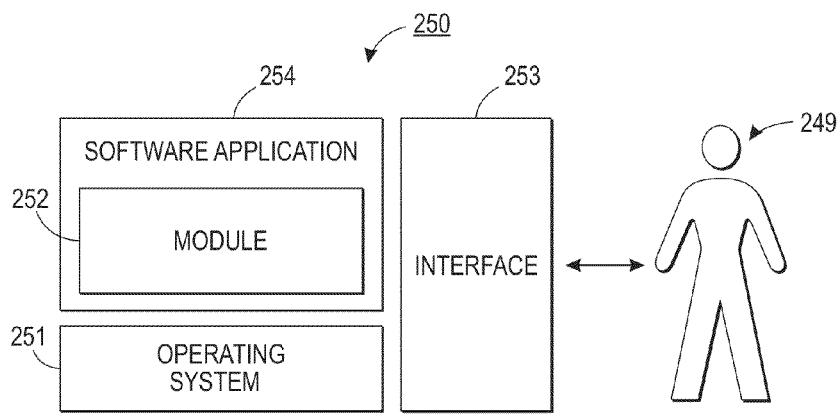
FIG. 5 illustrates a schematic view of a software system including a video-based parking space detection and reservation module, an operating system, and a user interface, in accordance with the disclosed embodiments.

FIGS. 4-5 are provided as exemplary diagrams of data-processing environments in which embodiments of the present invention may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, an embodiment may be implemented in the context of a data-processing system 200 that includes, for example, a central processor 201, a main memory 202, an input/output controller 203, a keyboard 204, an input device 205 (e.g., a pointing device such as a mouse, track ball, pen device, etc.), a display device 206, a mass storage 207 (e.g., a hard disk), and an image capturing unit 208. As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be, for example, a desktop computer, a wireless communications device (e.g. Smartphone), table computing device, a server, etc.

FIG. 5 illustrates a computer software system 250 for directing the operation of the data-processing system 200 depicted in FIG. 4. Software application 254, stored in main memory 202 and on mass storage 207, generally includes a kernel or operating system 251 and a shell or interface 253. One or more application programs, such as software application 254, may be "loaded" (i.e., transferred from mass storage 207 into the main memory 202) for execution by the data-processing system 200. The data-processing system 200 receives user commands and data through user interface 253. These inputs may then be acted upon by the data-processing system 200 in accordance with instructions from operating system 251 and/or software application 254.

The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to: routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term "module" as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term "module" may also simply refer to an application such as a computer program designed to assist in the performance of a specific task such as word processing, accounting, inventory management, etc. In one embodiment, module 252 can store and implement, for example, the instructions or steps of blocks 61, 62, 63, 64, 65, 66, 68 and 69 shown in FIG. 6.

The interface 253, which is preferably a graphical user interface (GUI), can serve to display results, whereupon a user may supply additional inputs or terminate a particular session. In some embodiments, operating system 251 and interface 253 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 251 and interface 253.

FIGS. 4-5 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

Figure 6:
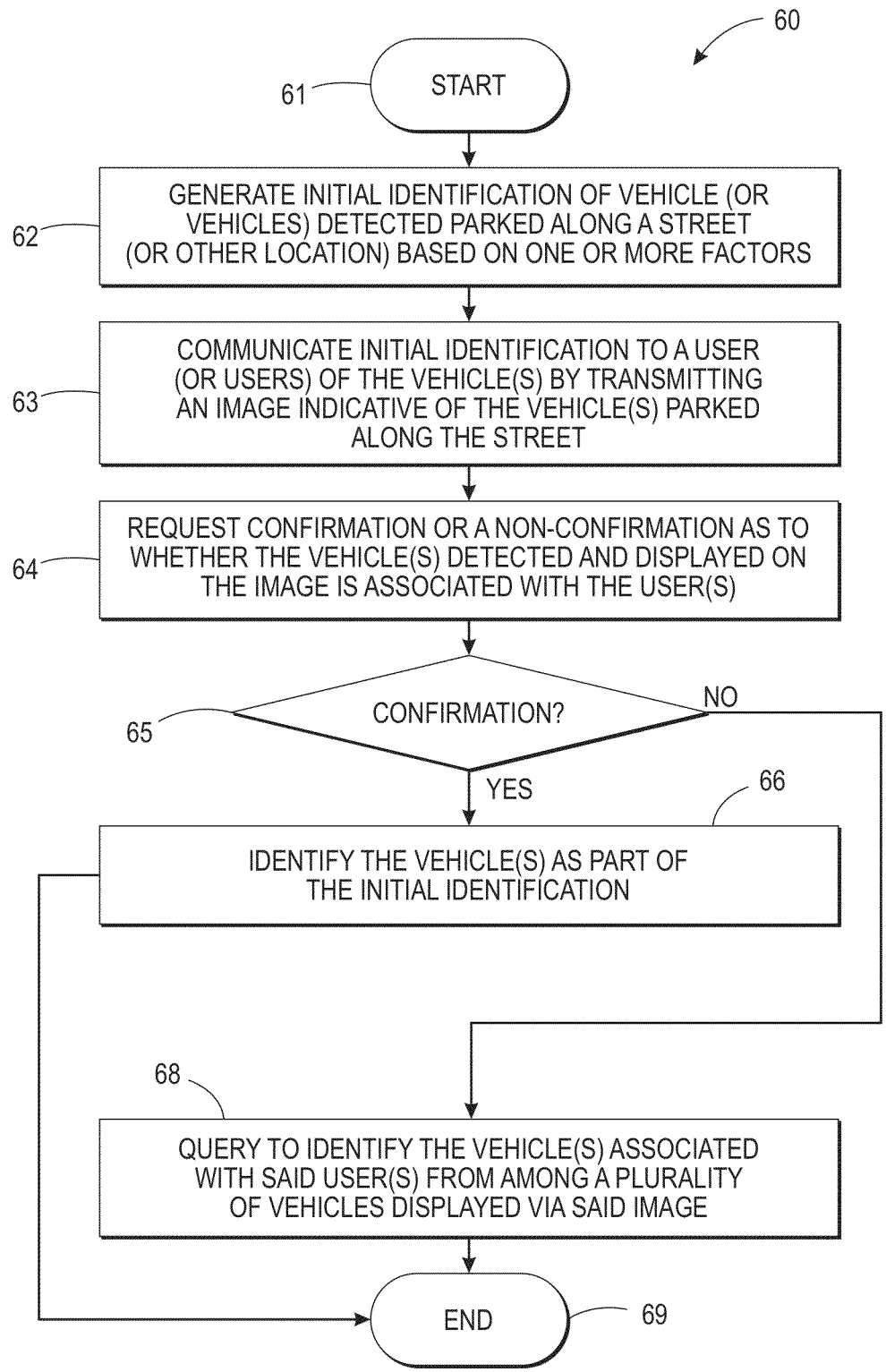
FIG. 6 illustrates a high level flow chart of operations illustrating logical operational steps of a method for identifying a vehicle for street parking management, in accordance with the disclosed embodiments.

FIG. 6 illustrates a high level flow chart of operations illustrating logical operational steps of a method 60 for identifying a vehicle for street parking management, in accordance with the disclosed embodiments. As indicated at block 61, the process begins. Thereafter, as shown at block 62, a step or logical operation can be implemented for generating an initial identification of one or more vehicles detected parked along a street based on at least one of a plurality of factors (e.g., a GPS location, a time stamp, a vehicle color, a vehicle size, a vehicle shape, etc.). Next, as depicted at block 63, a step or logical operation can be implemented communicating the initial identification to a user (or respective users) of the vehicle (or respective vehicles) by transmitting an image indicative of the vehicle(s) parked along the street to, for example, the user's wireless communications device for display of the image.

Then, as described at block 64, a step or logical operation can be implemented for requesting a confirmation or a non-confirmation as to whether the vehicle(s) detected and displayed on the image is associated with the user (or particular users). Upon confirmation (i.e. <"YES") as shown at decision block 65, a step or logical operation can be implemented as indicated at block 66 for identifying the vehicle(s) as the initial identification or part of the initial identification process. Upon non-confirmation (in response to a "NO" with respect to decision block 65), a step or logical operation can be implemented as depicted at block 68 for querying to identify the vehicle(s) associated with the user(s) from among a plurality of vehicles displayed via the image. The process can then terminate, as shown at block 69. Note that detection of the vehicle(s) occurs via, for example, a camera located with respect to a street (see, for example, the images shown in FIGS. 11(*a*) and 11(*b*)).

Figure 7:
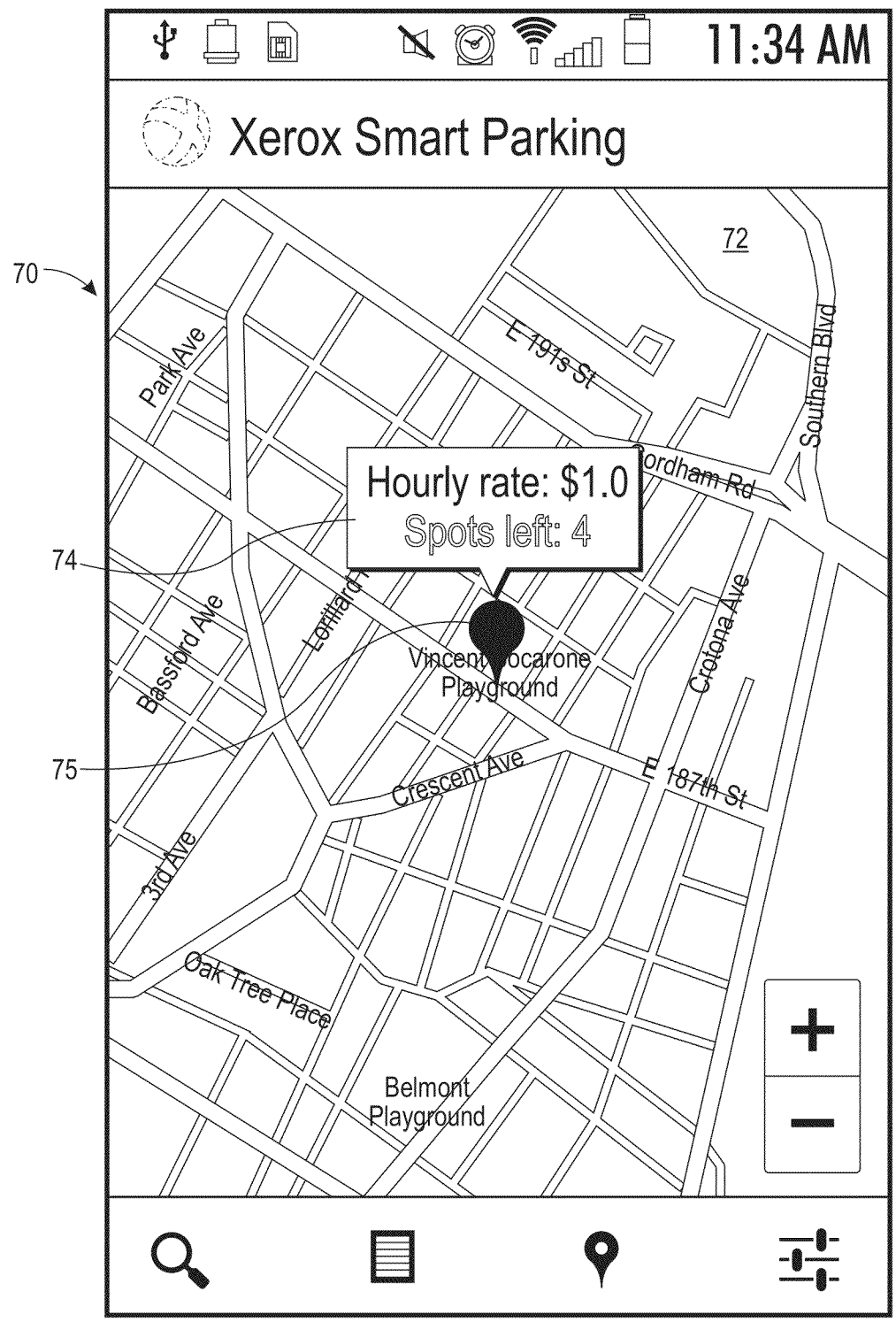
FIG. 7 illustrates a user interface of a mobile communications device displaying real-time available parking spots in a mapping application, in accordance with the disclosed embodiments.

FIG. 7 illustrates a user interface 70 of a mobile communications device displaying real-time available parking spots in a mapping application 72, in accordance with the disclosed embodiments. A graphically displayed balloon 74 in this particular example indicates an hourly parking rate of $1.0 with respect to four spots left at the particular location indicated by the marking 75 in the mapping application 72.

Figure 8:
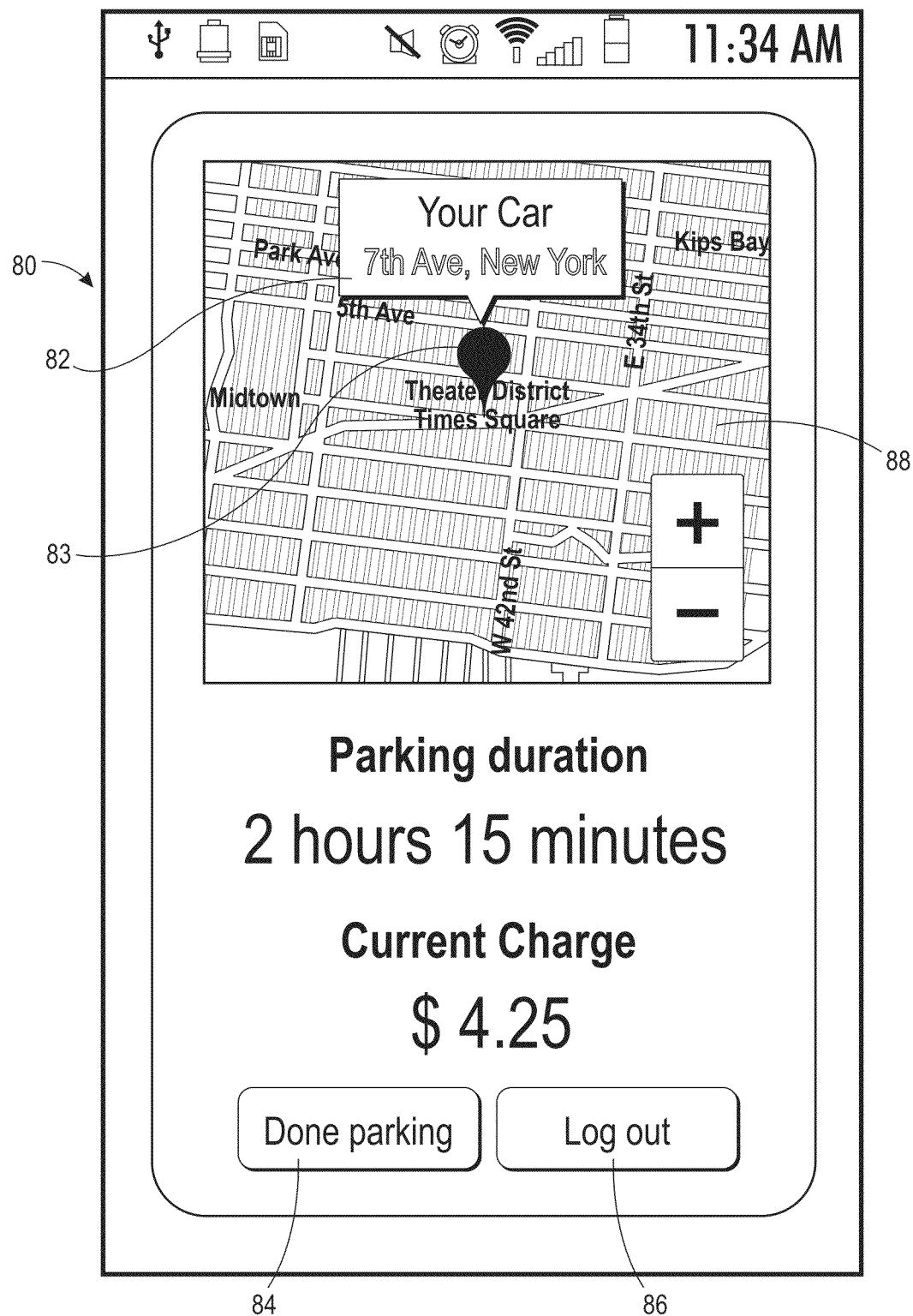
FIG. 8 illustrates a user interface of a mobile communications device displaying parking duration data and parking fee information for a particular parking session, in accordance with the disclosed embodiments.

FIG. 8 illustrates a user interface 80 of a mobile communications device displaying parking duration data and parking fee information for a particular parking session, in accordance with the disclosed embodiments. The user interface 80 shown in FIG. 8 includes a mapping application 88 in which a graphically displayed balloon 82 provides a notification regarding the location (i.e., marking 83) of the user's vehicle. A graphically display button 84 allows a user to verify completion of parking and button 86 permits the user to logout of the mobile application. Additionally, parking duration and current charge information can be displayed within the user interface 80.

Figure 9:
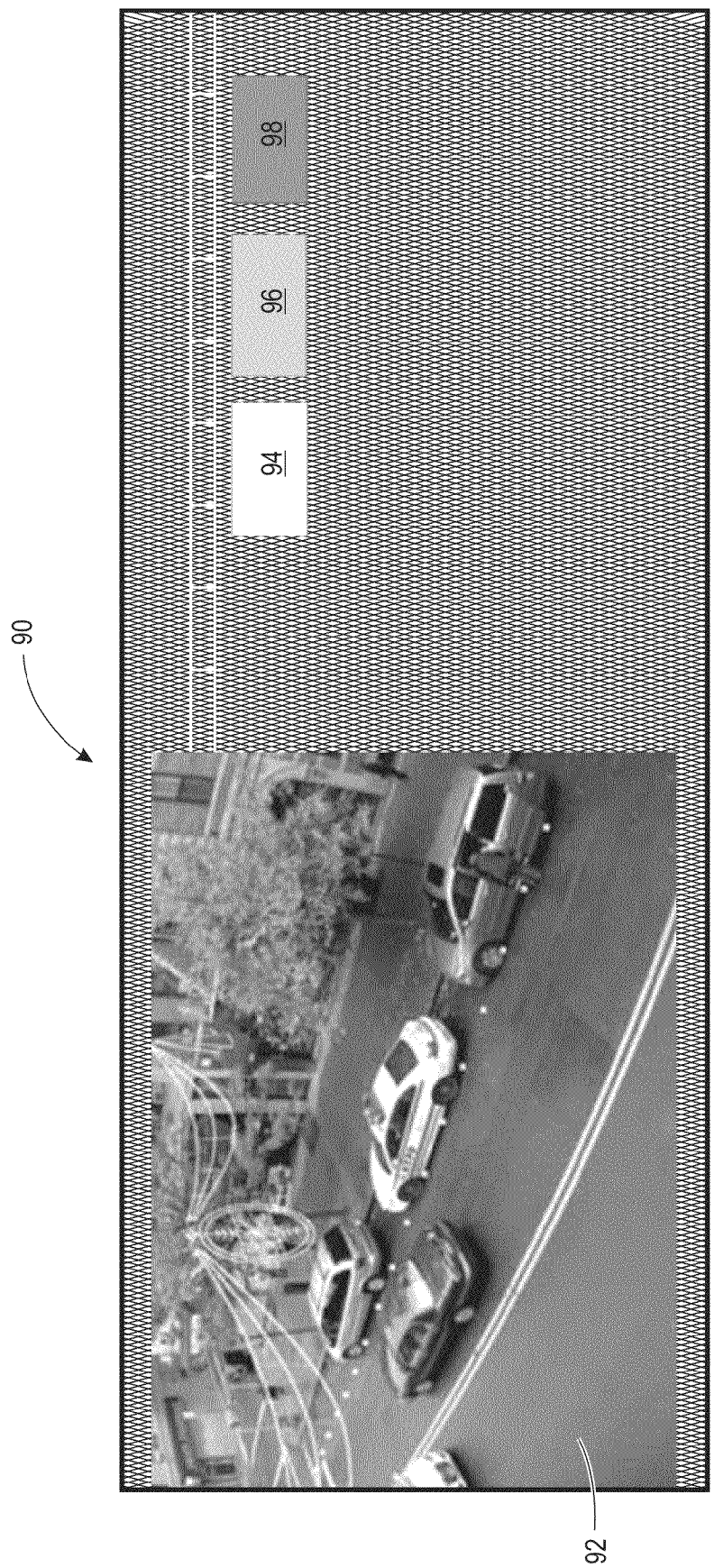
FIG. 9 illustrates an image example of parking vehicle detection accomplished via the disclosed embodiments.
Figure 10:
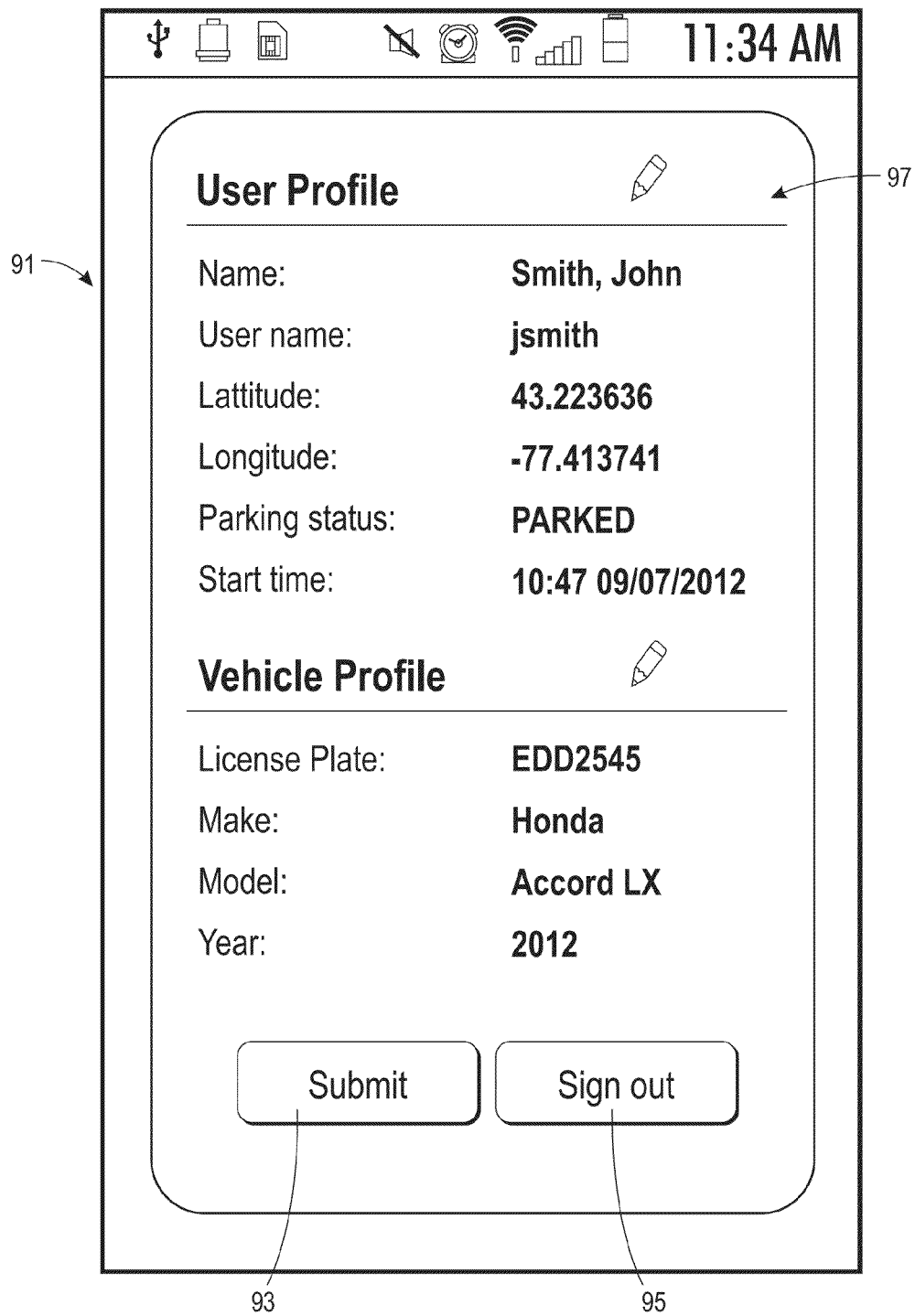
FIG. 10 illustrates a user interface of a mobile communications device in which a user can initiate a parking session by logging into a mobile application and clicking a graphically displayed submit button, in accordance with the disclosed embodiments.

FIG. 9 illustrates an image example 90 of parking vehicle detection accomplished via the disclosed embodiments. In general, example 90 illustrates in an image 92, the detection of one or more vehicles parked on, for example, a street side or within a street block of the disclosed video based parking occupancy detection technology. Boxes 94, 96, 98 respectively show the three vehicles parked along the street shown in the left hand side panel detected by VPODT. The user/driver who is already registered (or registering) for a parking account sends a "start parking" message to initiate the parking session using his/her mobile device (or a vehicle on-board wireless communication device). FIG. 10 shows how this message can be initiated from a mobile application or "app". Note that an "app" as utilized herein refers generally to application software designed to help a user perform a singular or multiple related specific tasks. The account of the user typically contains the user's account number (or license plate number) and vehicle's profile (manufacture, model, vehicle color, etc.). Together with the "start parking" message, the mobile device's GPS location and the message's time stamp are also sent to a server for processing.

FIG. 10 thus illustrates a user interface 91 of a mobile communications device in which a user can initiate a parking session by logging into the mobile application 97 and "clicking" a graphically displayed submit button 93, in accordance with the disclosed embodiments. The data shown in the mobile application 97 includes, for example, the user profile information, the user name, the latitude and longitude of the parked vehicle, along with the parking status (e.g., PARKED) and the time parking begins. Vehicle profile data can be also displayed within the mobile application 97. An example "sign out" button 95 is also shown in FIG. 10.

As indicated previously, one of the features of the disclosed embodiments involves the ability to closely match features for one of the detected vehicles to the vehicle profile from registration and the "start parking" message using GPS location, time stamp, vehicle color, and vehicle size. Note that one of the principal advantages of the disclosed approach stems from the implementation of graphical feedback, which is described in greater detail in the next several paragraphs. The reliability of information provided by the vehicle color and size may be limited.

Another feature of the disclosed embodiments involves the ability to send the image of the closely matched vehicle to the user's mobile device to ask if this is his/her vehicle. If yes, an operation can be implemented to associate this vehicle to the user's account; if no, an image of a larger section of the street can be displayed and the user can be requested to identify his/her vehicle in the image. Mobile user interface tools such as, for example, sliding, re-sizing, pointing, etc., can be applied. Note that while in most cases where the closely matched vehicle is the correct vehicle, it is possible mismatches may occur even with added color and size as differentiators. For example, it would be difficult to distinguish two close colored and sized vehicles coming to park next to each other in space and time. To be absolutely sure (i.e., a requirement for account based parking payment system) that the right vehicle is associated with the right account, this step is preferably required.

Figure 11A:
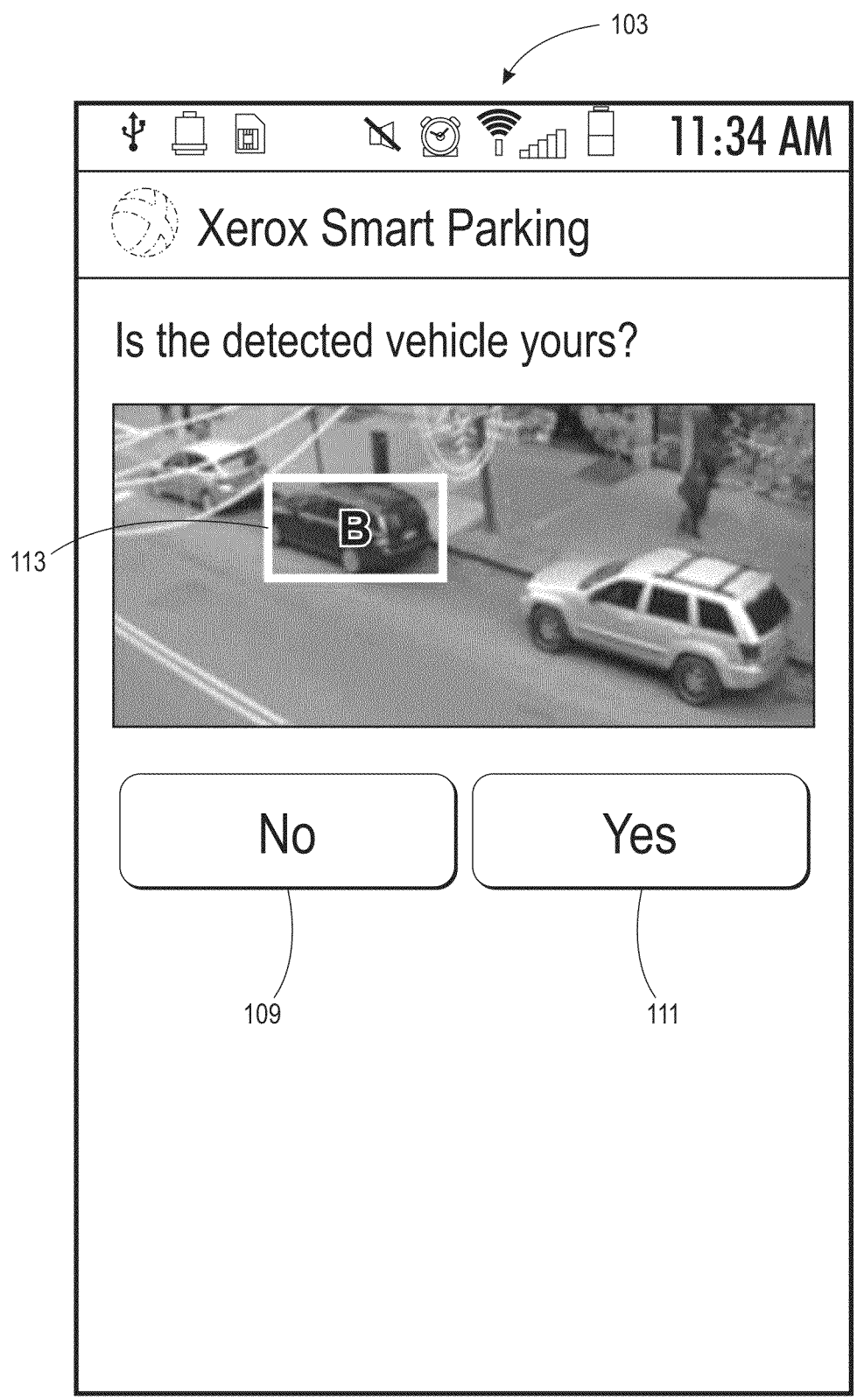
FIGS. 11(*a*), 11(*b*), and 11(*c*) illustrate a user interface of a mobile communications device specifically varying screens displayable for permitting a user to verify a detected vehicle, select the vehicle, and verify initation of a parking session, in accordance with the disclosed embodiments.
Figure 11B:
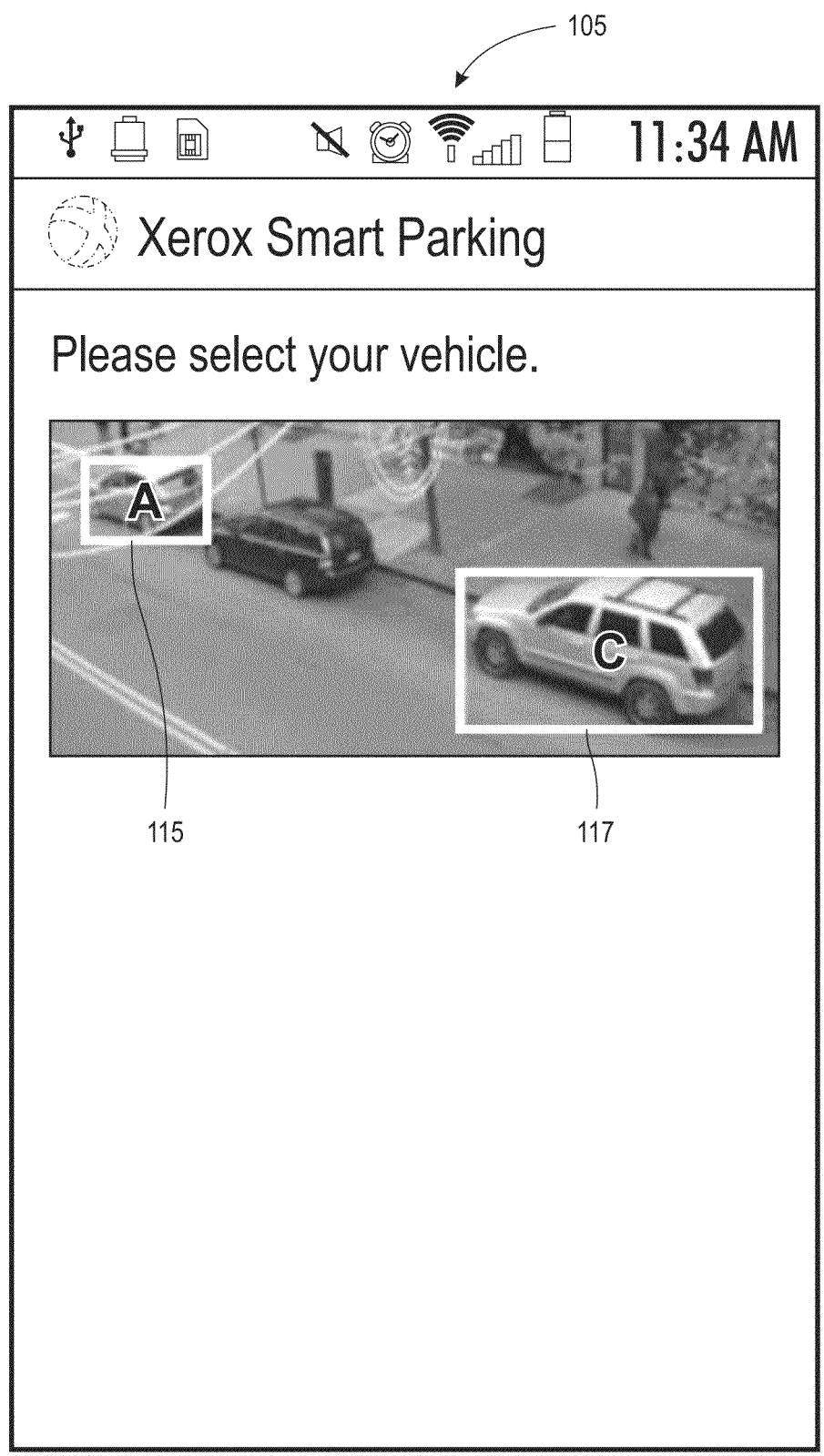
Figure 11C:
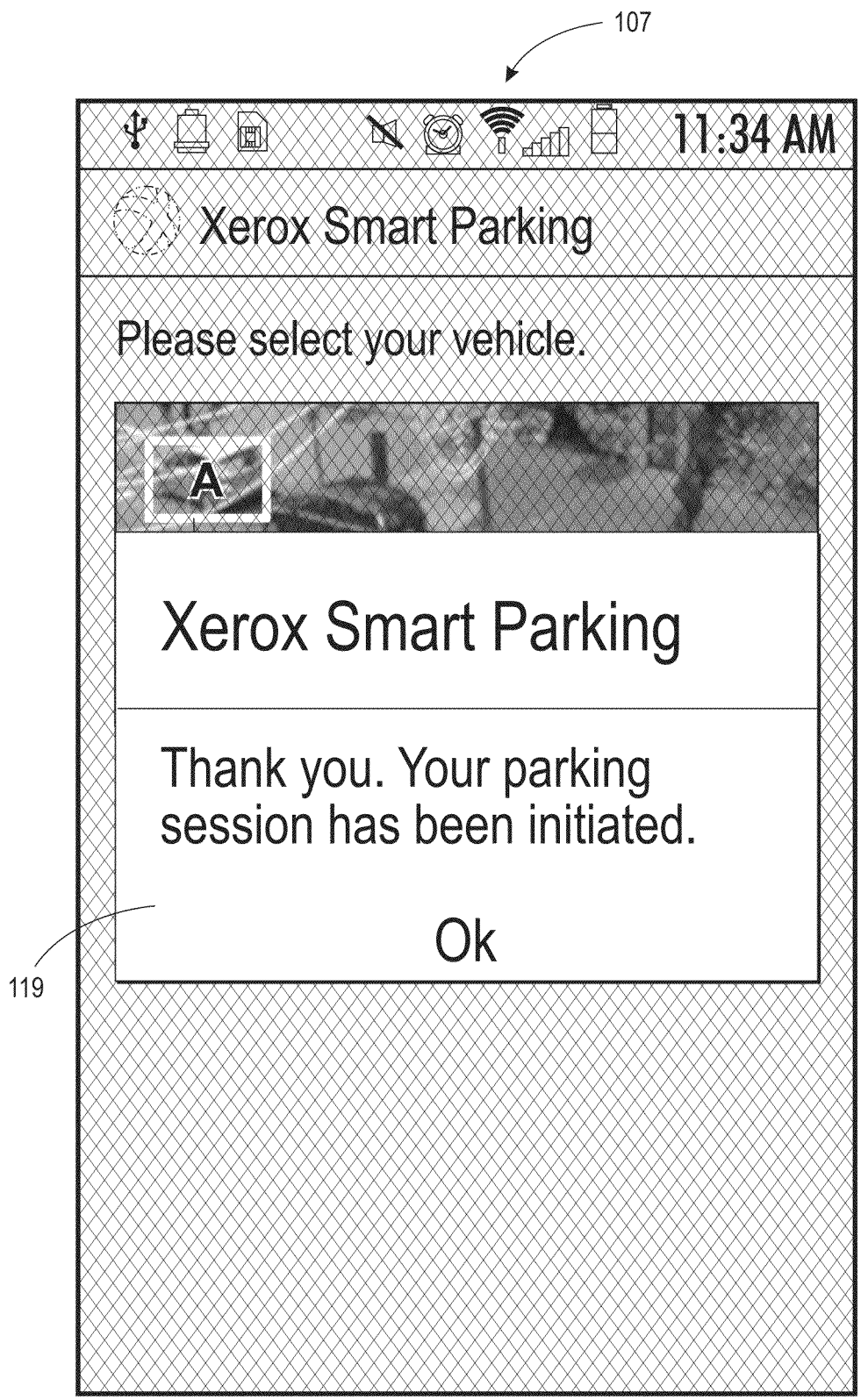

FIGS. 11(*a*), 11(*b*), and 11(*c*) illustrate how this step can be accomplished. FIGS. 11(*a*), 11(*b*), and 11(*c*) illustrate a user interface of a mobile communications device specifically varying screens 103, 105, and 107 displayable for permitting a user to verify a detected vehicle, select the vehicle, and verify initiation of a parking session, in accordance with the disclosed embodiments. In FIG. 11(*a*), for example, the detected and closely matched vehicle is shown within a bounding box 113 (i.e., box B). If the user clicks the "yes" button 111, this vehicle will be taken as the right vehicle. If the user clicks the "no" button 109, the user is presented with a choice of all other vehicles on this street side as shown in FIG. 11(b) and can select one of these vehicles. For example, the user can select the vehicle shown within the bounding box 115 (i.e., box A) or the bounding box 117 (i.e., box C). FIG. 11(c) indicates via a graphically displayed notification 119 that, for example, the parking session has been initiated.

Figure 12:
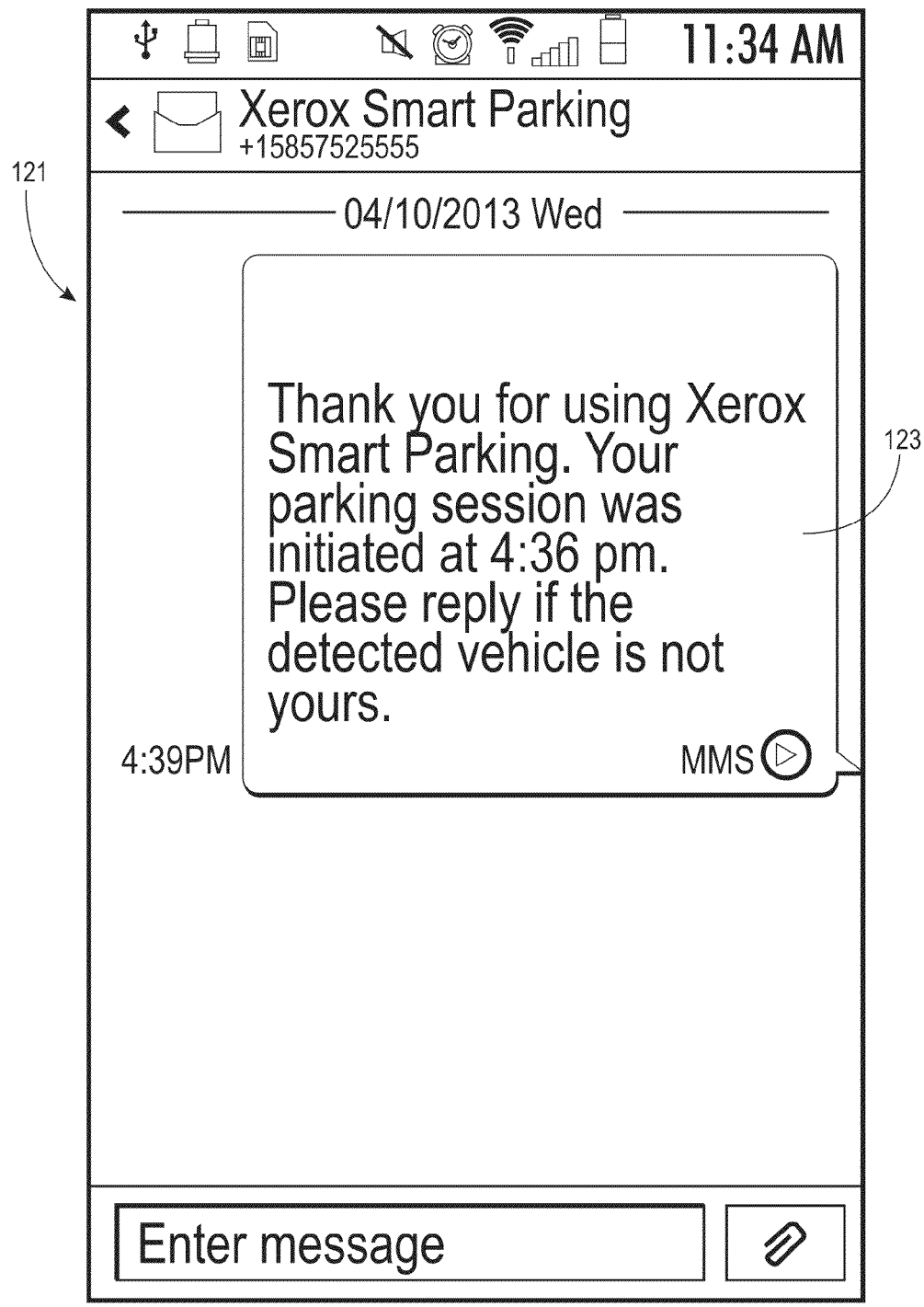
FIG. 12 illustrates a user interlace of mobile communications device with user of SMS (Short Messaging Services) or tenting features, in accordance with the disclosed embodiments.

Alternatively, the server can send a SMS to the user with the image and a message such as the one shown in FIG. 12. Upon receiving a returning message indicating a wrong vehicle, the user can be presented with the graphical interface shown in FIG. 11(b). Otherwise, the user does not need to do anything. FIG. 12 illustrates a user interface 121 of a mobile communications device with user of SMS (Short Messaging Services) or texting features, in accordance with the disclosed embodiments. An example SMS message 123 is shown FIG. 12.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A method for identifying a vehicle for street parking management, said method comprising:
    generating an initial identification of at least one vehicle detected parked along a street based on at least one of a plurality of factors;
    communicating said initial identification to a user of said at least one vehicle by transmitting and displaying an image indicative of said at least one vehicle parked along said street;
    requesting a confirmation or a non-confirmation as to whether said at least one vehicle detected and displayed on said image is associated with said user;
    upon said confirmation, identifying said at least one vehicle as said initial identification; and
    upon said non-confirmation, querying to identify said at least one vehicle associated with said user from among a plurality of vehicles displayed via said image.

2. The method of claim 1 further comprising detecting said at least one vehicle parked along said street via a camera.

3. The method of claim 2 wherein said plurality factors includes at least one of the following: a time stamp, a vehicle color, a vehicle size, and a vehicle shape.

4. The method of claim 1 transmitting said image to said user via a wireless communications device.

5. The method of claim 3 wherein said plurality of factors further comprises a GPS location.

6. The method of claim 4 wherein said wireless communications device comprises an on-board wireless communications device associated with said at least one vehicle detected parked along said street.

7. The method of claim 1 wherein said image displays a bounding box of said at least vehicle detected parked along said street.

8. The method of claim 1 wherein said confirmation from said user comprises user inputs via a graphical user interface.

9. The method of claim 8 wherein said user inputs include clicking a graphically displayed yes button or no button, a graphically displayed bounding box of said at least one vehicle on said image, and said at least one vehicle displayed on said image.

10. The method of claim 1 wherein said at least one vehicle associated with said user is pre-registered.

11. A system for identifying a vehicle for street parking management, said system comprising:
    a computer-usable medium embodying computer program code, said computer-usable medium capable of communicating with the processor, said computer program code comprising instructions executable by said processor and configured for:
        generating an initial identification of at least one vehicle detected parked along a street based on at least one of a plurality of factors;
        communicating said initial identification to a user of said at least one vehicle by transmitting and displaying an image indicative of said at least one vehicle parked along said street;
        requesting a confirmation or a non-confirmation as to whether said at least one vehicle detected and displayed on said image is associated with said user;
        upon said confirmation, identifying said at least one vehicle as said initial identification; and
        upon said non-confirmation, querying to identify said at least one vehicle associated with said user from among a plurality of vehicles displayed via said image.

12. The system of claim 11 wherein said instructions are further configured for detecting said at least one vehicle parked along said street via a camera.

13. The system of claim 12 wherein said plurality of factors includes at least one of the following: a time stamp, a vehicle color, a vehicle size, and a vehicle shape.

14. The system of claim 11 wherein said instructions are further configured for transmitting said image to said user via a wireless communications device.

15. The system of claim 13 wherein said plurality of factors further comprises a GPS location.

16. The method of claim 15 wherein said image displays a bounding box of said at least one vehicle detected parked along said street and wherein said confirmation from said user comprises user inputs via a graphical user interface.

17. A non-transitory processor-readable medium storing code representing instructions to cause a process for identifying a vehicle for street parking management, said code comprising code to:

generate an initial identification of at least one vehicle detected parked along a street based on at least one of a plurality of factors;

communicate said initial identification to a user of said at least one vehicle by transmitting and displaying an image indicative of said at least one vehicle parked along said street;

request a confirmation or a non-confirmation as to whether said at least one vehicle detected and displayed on said image is associated with said user;

upon said confirmation, identify said at least one vehicle as said initial identification; and upon said non-confirmation, query to identify said at least one vehicle associated with said user from among a plurality of vehicles displayed via said image.

18. The non-transitory processor-readable medium of claim 17 wherein said code further comprises code to detect said at least one vehicle parked along said street via a camera.

19. The non-transitory processor-readable medium of claim 17 wherein said plurality of factors includes at least one of the following: a time stamp, a vehicle color, a vehicle size, and a vehicle shape.

20. The non-transitory processor-readable medium of claim 19 wherein said code further comprises code to transmit said image to said user via a wireless communications device and wherein said plurality of factors further includes a GPS location.

* * * * *